Jan. 23, 1945.   C. E. SCHUBERT   2,367,740
TURNBUCKLE SECURING DEVICE
Filed Jan. 25, 1943
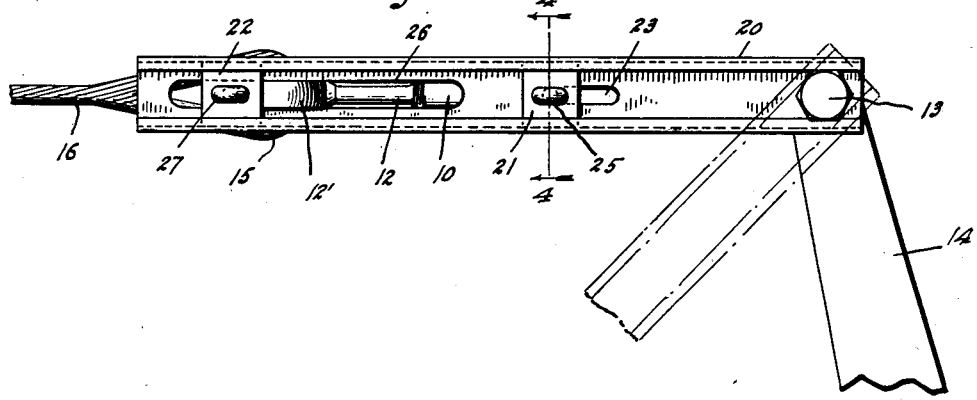
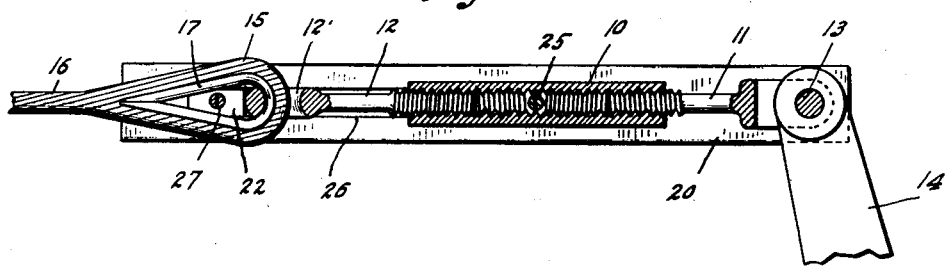
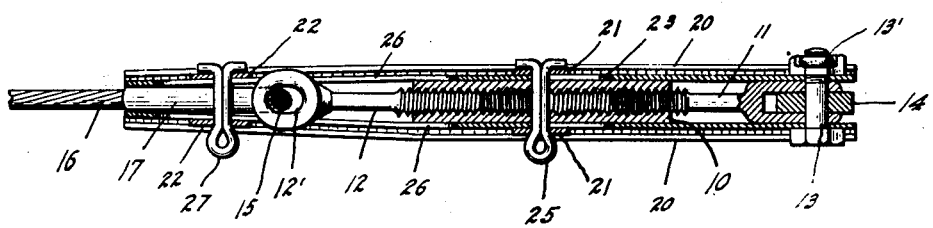
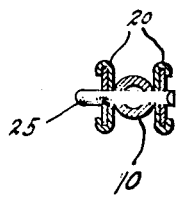
INVENTOR.
CARL E. SCHUBERT,
BY  Schley + Trask
ATTORNEYS.

Patented Jan. 23, 1945

2,367,740

UNITED STATES PATENT OFFICE 2,367,740

TURNBUCKLE SECURING DEVICE

Carl E. Schubert, Lansing, Mich.

Application January 25, 1943, Serial No. 473,437

8 Claims. (Cl. 287—60)

This invention relates to a device for securing turnbuckles against movement of their parts from adjusted position.

In many uses, turnbuckles must be securely fastened against relative movement of their parts. This is especially true with turnbuckles used on aircraft, for such purposes as adjustment of tension on stay or brace wires, adjustment of cables interconnecting the pilot's operating members with the control elements of motors and other mechanism, and with control surfaces such as ailerons and rudders; for it is extremely important that turnbuckles in these uses maintain their adjusted position, and in aircraft such parts undergo severe service, in which they are subjected to vibration, repeated stress variations, stress reversals, peak loads, etc. The present method of securing turnbuckles in these applications is frequently troublesome to use, and requires considerable care; and the dangerous possibility of its inadequate or improper use and of its failure is recognized. Serious accidents have been traced to such failure, and the Civil Aeronautics Authority in several bulletins has warned against carelessness and of such possible failure, and has made recommendations toward improvement of the method.

As customarily used in airplanes, a turnbuckle consists of sleeve with its two ends internally threaded with threads of opposite hand, and two threaded bolts received in that sleeve and respectively attached to the parts which the turnbuckle connects. (I use the term "bolts" to refer generically to the two end-pieces of the turnbuckle, whether they are eye-bolts, yoke- or clevis-bolts, or of some other type.) In prior practice it has been customary to secure turnbuckles against movement by passing a wire through a central transverse hole in the turnbuckle sleeve and to wrap the wire-ends in a long spiral around the turnbuckle in a direction to prevent unscrewing of the turnbuckle bolts, and to secure the wire ends to the turnbuckle bolts, as by wrapping several times around the bolt-shanks.

The conditions of aircraft use make difficult the use of such turnbuckle securing wires, for the turnbuckles are frequently in inaccessible locations, and it is of course necessary to remove the old wire before making any adjustment, and to re-secure the turnbuckle with new wire after each adjustment.

Such aircraft use, moreover, imposes severe conditions on the turnbuckle securing device. Frequently, a twisted-wire cable is directly connected to one, and sometimes both, of the turnbuckle bolts. Such a cable tends under tension to untwist, and thus to cause rotation of the turnbuckle part to which it is connected and hence to cause relative screwing or unscrewing of the turnbuckle parts. Under repeated variations of tension on such a cable-turnbuckle combination, and the consequent repeated variations of force tending to twist one turnbuckle bolt with respect to the other, the turnbuckle parts may creep toward released and disconnected position, for each variation of such twisting force tends to unscrew one or the other of the bolts with respect to their interconnecting sleeve. The effect, as on a wire fastening, is to impose a severe load tending to stretch and break the securing wire. In addition, such twisting may tend to cause a turnbuckle bolt to be alternately screwed and unscrewed with respect to the sleeve the effect of which on a wire fastening may loosen it, or cause repeated flexing of the wire, since the wire resists such relative rotation of the parts in only one direction. In addition, any such movement and the vibration which also occurs tends to cause wear of the securing device, as for example where a wire fastening rests against an edge or corner of a turnbuckle part, and thus to weaken such wire against the stresses caused by the twisting.

It is the primary object of my invention to provide a turnbuckle securing device which will give greater safety, and will effectively withstand all such conditions of use as those mentioned above. It is my further object to make such securing device so that it may be permanently associated with the turnbuckle, but will be easily releasable for adjustment of the turnbuckle; to make it light in weight; and to make it hold the turnbuckle parts firmly and prevent each of them from turning relatively with respect to any other of them.

In accomplishing these objects, I provide a pair of substantially rigid plates adapted to lie along the sides of the turnbuckles and to be fastened to one of the turnbuckle bolts, preferably in a manner which permits them to be swung out of the way to give access for adjustment of the turnbuckle sleeve. Intermediate the ends of each plate, I provide means to receive a pin which passes through the transverse hole in the turnbuckle sleeve, and I make such means longitudinally adjustable to accommodate the normal range of adjustment of the turnbuckle sleeve. At the other end of each plate I provide similar pin-receiving means for a pin which secures the bolt at that end of the turnbuckle, and I make this pin-receiving means similarly adjustable to accommodate the normal range of adjustment of its associated turnbuckle bolt.

The accompanying drawing illustrates my invention. In such drawing, Fig. 1 is a side elevation of a turnbuckle which interconnects a lever with a control cable, and which has associated with it a securing device embodying my invention; Figs. 2 and 3 are respectively a vertical section and a horizontal section of the assembly shown in Fig. 1; and Fig. 4 is a vertical transverse section on the line 4—4 of Fig. 1.

The turnbuckle shown in the drawing consists of an internally threaded sleeve 10 which receives in its right-hand end a yoke-bolt 11 and in its left-hand end an eye-bolt 12. The yoke-bolt 11 is secured by means of a pin 13 to a lever 14, such as an operating lever. The eye-bolt 12 receives the looped end 15 of a control cable 16 which leads to the part which is to be operated by the operating lever 14. The cable loop 15 is desirably provided with a thimble 17, to relieve strain and wear on the cable itself.

The parts so far described are all old, and exemplify standard construction.

To secure the turnbuckle and its aforesaid associated parts against relative rotation about the axis of the turnbuckle sleeve, a plate 20 is placed along each side of the turnbuckle. Each plate has its side edges turned inward to provide a pair of facing channels and to contribute stiffness. At one end, each plate is provided with a hole to receive the pin 13 which connects the yoke-bolt 11 of the turnbuckle to its associated lever 14. As shown, the pin 13 is in the form of a bolt whose nut is suitably secured as by means of a cotter pin 13'. This means of mounting the two plates 20 permits them to be swung about the pin 13, as to the dotted-line position shown in Fig. 1, to give access for adjustment of the sleeve 10 of the turnbuckle.

In the aforementioned facing channels of each plate 20, there are mounted a pair of pin-receiving washers 21 and 22 which are each slidably movable over at least a limited range lengthwise of the associated plate 20.

The turnbuckle sleeve 10 is provided with a central transverse hole by means of which it may be turned and which will receive means for fastening it against turning. Over the normal range of positions of that transverse hole, each plate 20 is provided with a slot 23. To secure the sleeve 10 in its adjusted position, the washers 21 are moved to alinement with the transverse hole in the sleeve 10, and a cotter pin 25 is passed through the two washers 21, the slots 23, and the said hole of the sleeve 10, and the ends of the cotter pin 25 are spread to secure it in place.

Toward its free end, each plate 20 is provided with a relatively wider slot 26 which will receive side portions of the eye 12' of the eye-bolt 12. Such slots 26 are of a length to accommodate the full range of adjusted positions of that eye 12', and extend somewhat beyond toward the ends of the plates 20. Desirably, the ends of the plates 20 which are associated with the eye 12' are slightly bent toward each other, so that they lie snugly against the thimble 17. To secure this end of the turnbuckle, the washers 22 are moved to alinement with the opening through the thimble 17, and a cotter pin 27 is passed through such washers 22, the slots 26, and the said thimble opening. That cotter pin 27 holds the plates so that the eye 12' is securely received within the slots 26, and by its passage through the thimble 17 provides added protection against rotation of the eye-bolt 12.

The two stiff plates 20 are thus pinned together at three spaced points, and are held snugly against the sides of the turnbuckle parts, so that all the associated parts are firmly held together; and tendencies toward relative rotation of the turnbuckle elements are transmitted directly to and resisted by the two plates 20.

The two plates 20 are desirably and conveniently made of a light metal. The inwardly-bent edges provide ample rigidity so that when the turnbuckle parts are fastened to them, such parts will be safely held against relative movement. The provision of the slots 23 and 26, and the slidably mounted washers 21 and 22 adapt the device to accommodate the full range of adjustment of the turnbuckle. The fastening device may be easily released for adjustment of the turnbuckle by the simple removal of the two cotter pins 25 and 27, and the two plates 20 may then be swung out of the way to permit that adjustment. In re-securing the turnbuckle, the main parts of the fastening device are reusable and are in position to be swung to their fastening positions, so that it is only necessary to insert new cotter pins 25 and 27 in order to complete the operation of re-securing the turnbuckle.

The fastening device is exemplified therein on a turnbuckle which connects a lever with a cable, in which situation one of the turnbuckle bolts is a yoke-bolt and the other is an eye-bolt. But the securing device is readily adaptable for use with other turnbuckles, such as those which have two eye-bolts. In that case, the right-hand end of the fastening device may be secured in a manner similar to that shown at the left-hand end, as by passing a cotter pin through an opening either in the eye of the bolt or in the thimble of the cable attached to that eye-bolt.

I claim as my invention:

1. A turnbuckle securing device, comprising an elongated stiff plate the side edges of which are turned inwardly to form a pair of facing channels, a hole at one end of said plate by which it is adapted to be secured with respect to one bolt of an associated turnbuckle, a securing pin for the sleeve of such a turnbuckle, a slidable pin-receiver carried in said facing channels to receive said pin, a slot in said plate to receive a radially extending portion of the other bolt of such a turnbuckle, and means adapting said plate to be held with said slot in rotation-preventing relationship with such other bolt.

2. A turnbuckle securing device, comprising an elongated stiff plate the side edges of which are turned inwardly to form a pair of facing channels, means at one end of said plate by which it is adapted to be secured with respect to one bolt of an associated turnbuckle, a pair of washers mounted in said facing channels and slidable therealong, openings in said washers, said plate being slotted beneath said washer openings over a range of sliding of each of said washers, whereby said washers may be pinned through said washer openings to the sleeve and other bolt of such an associated turnbuckle over ranges of adjustment thereof.

3. A turnbuckle securing device, comprising an elongated member adapted to lie along side a turnbuckle, means at one end thereof by which it is adapted to be secured with respect to one element of an associated turnbuckle, a securing pin for a second element of such an associated turnbuckle, a securing pin for a third element of such associated turnbuckle, a pair of pin-receivers mounted on said member, and independently movable longitudinally thereof, whereby said pins may secure said second and third elements over a range of adjusted positions thereof.

4. A turnbuckle securing device, comprising an elongated member adapted to lie along side a turnbuckle, means at one end of said member to receive the yoke-bolt fastening pin of an associated turnbuckle, a pair of pin-receivers mounted on said member, one of said pin-receivers being positioned to be pinned to the sleeve of such an associated turnbuckle and movable longitudinally of said member over the range of adjusted positions of said sleeve, the other of said pin-receivers being positioned to be pinned to the other bolt of such associated turnbuckle and movable longitudinally of said member over the range of adjusted positions of such associated bolt.

5. A device for securing against relative movement the two bolts and the interconnecting sleeve of a turnbuckle, comprising a pair of plates adapted to lie along the sides of a turnbuckle, means for securing said plates to one of said bolts and preventing rotation of said bolt with respect to said plates, a pin-receiving washer carried by each of said plates and slidable therealong for alinement with the sleeve of said turnbuckle over the range of normal positions thereof, a second pin-receiving washer carried by each of said plates and slidable therealong to accommodate the range of normal positions of the other bolt of the turnbuckle, each of said washers being provided with a pin-receiving hole and said plates being provided with openings to pass pins received in said holes, and pins adapted to be received in said holes and to secure the respectively associated turnbuckle elements against rotation with respect to said plates.

6. A turnbuckle securing device, comprising a pair of elongated stiff members adapted to lie along the sides of a turnbuckle, means for pivotally interconnecting said members through one of the elements of said turnbuckle, and means for releasably interconnecting said members and adapted to extend through another element relatively rotatable with respect to said first element, to prevent relative rotation of said elements.

7. A turnbuckle securing device, comprising a pair of elongated stiff members adapted to lie along the sides of a turnbuckle, means for securing said members with respect to one element of said turnbuckle, longitudinally adjustable means on said members for securing a second turnbuckle element to said members to prevent its relative rotation, and means on said members to embrace a third turnbuckle element in rotation-preventing relationship.

8. A turnbuckle securing device, comprising a pair of elongated stiff members adapted to lie along the sides of a turnbuckle, means to pin said members together at three points longitudinally of said members, said pinning means being adapted to cooperate respectively in rotation-preventing relationship with elements of said turnbuckle.

CARL E. SCHUBERT.